United States Patent
Rodriguez et al.

(10) Patent No.: US 7,321,555 B2
(45) Date of Patent: Jan. 22, 2008

(54) MULTILEVEL ANALYSIS OF SELF-SIMILAR NETWORK TRAFFIC

(75) Inventors: Jorge R. Rodriguez, Cary, NC (US); Kaiqi Xiong, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 10/417,468

(22) Filed: Apr. 16, 2003

(65) Prior Publication Data

US 2004/0208131 A1    Oct. 21, 2004

(51) Int. Cl.
*H04J 1/16* (2006.01)

(52) U.S. Cl. .................... 370/231; 370/235

(58) Field of Classification Search ........... 370/229, 370/230, 231, 232–235.1, 389, 252, 237, 370/238, 253
See application file for complete search history.

(56) References Cited

U.S. PATENT DOCUMENTS

| | | | |
|---|---|---|---|
| 5,276,677 A | 1/1994 | Ramamurthy et al. ........ 370/60 |
| 5,343,465 A * | 8/1994 | Khalil ........................ 370/232 |
| 5,883,819 A | 3/1999 | Abu-Amara et al. ........ 364/578 |
| 5,886,907 A * | 3/1999 | Abu-Amara et al. .......... 703/21 |
| 6,058,260 A | 5/2000 | Brockel et al. ........ 395/500.25 |
| 6,075,770 A * | 6/2000 | Chang et al. .......... 370/395.21 |
| 6,144,639 A | 11/2000 | Zhao et al. .................. 371/235 |
| 6,233,226 B1 | 5/2001 | Gringeri et al. ............. 370/252 |
| 6,304,549 B1 * | 10/2001 | Srinivasan et al. ......... 370/230 |
| 6,373,824 B1 | 4/2002 | Tang et al. .................. 370/252 |
| 6,377,992 B1 | 4/2002 | Fernández et al. .......... 709/227 |
| 6,414,942 B1 | 7/2002 | Ito et al. ...................... 370/250 |
| 6,526,259 B1 * | 2/2003 | Ho .......................... 455/67.11 |
| 6,715,005 B1 * | 3/2004 | Rodriguez et al. ............. 710/41 |

OTHER PUBLICATIONS

A Real-time Algorithm for 'Burstiness' Analysis of Network Traffic, Khalil, Bell Communications Research, 1992, IEEE.
"The Effect of Bursty Traffic on the Performance of Local Area Networks", Khalil et al, Bellcore, 1992, IEEE.
"How does TCP generate Pseudo-self-similarity?", Guo et al, Boston University, 2001 IEEE.

* cited by examiner

*Primary Examiner*—Brenda Pham
(74) *Attorney, Agent, or Firm*—Joscelyn G. Cockburn; James A. Lucas; Driggs, Hogg & Fry Co., LPA

(57) ABSTRACT

Self-similar data communication in network traffic is modeled real time and is analyzed using a Markov modified Poissen process (MMPP) to characterize the traffic flow and to accommodate high variability in traffic flow from one time period to the other. The analysis is performed at multiple time levels using a bottom-up approach. The parameters of the model are adjustable at each level according to the traffic parameters at that level. Each model consists of 2 states of network traffic behavior comprising a bursty state representing heavy traffic conditions and an idle state representing light traffic conditions. A transition window defines the upper time interval for the receipt of packets in the bursty state and the lower time interval for the receipt of packets in the idle state. If the inter-rival times for the bursty state and the idle state become approximately equal, the model defaults to a single state model.

22 Claims, 7 Drawing Sheets

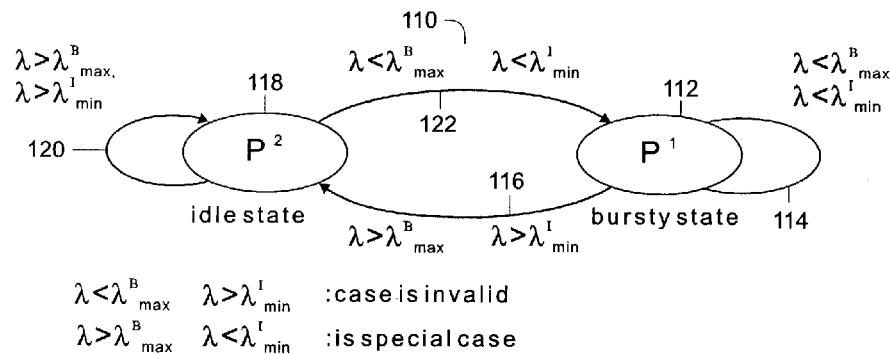
Fig: 1
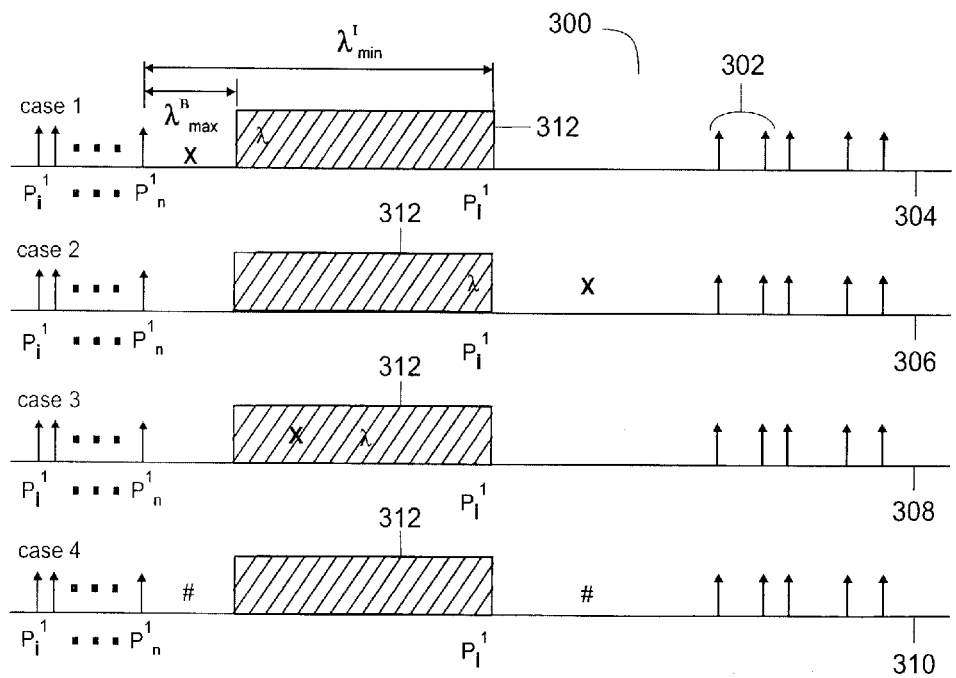
Fig: 3

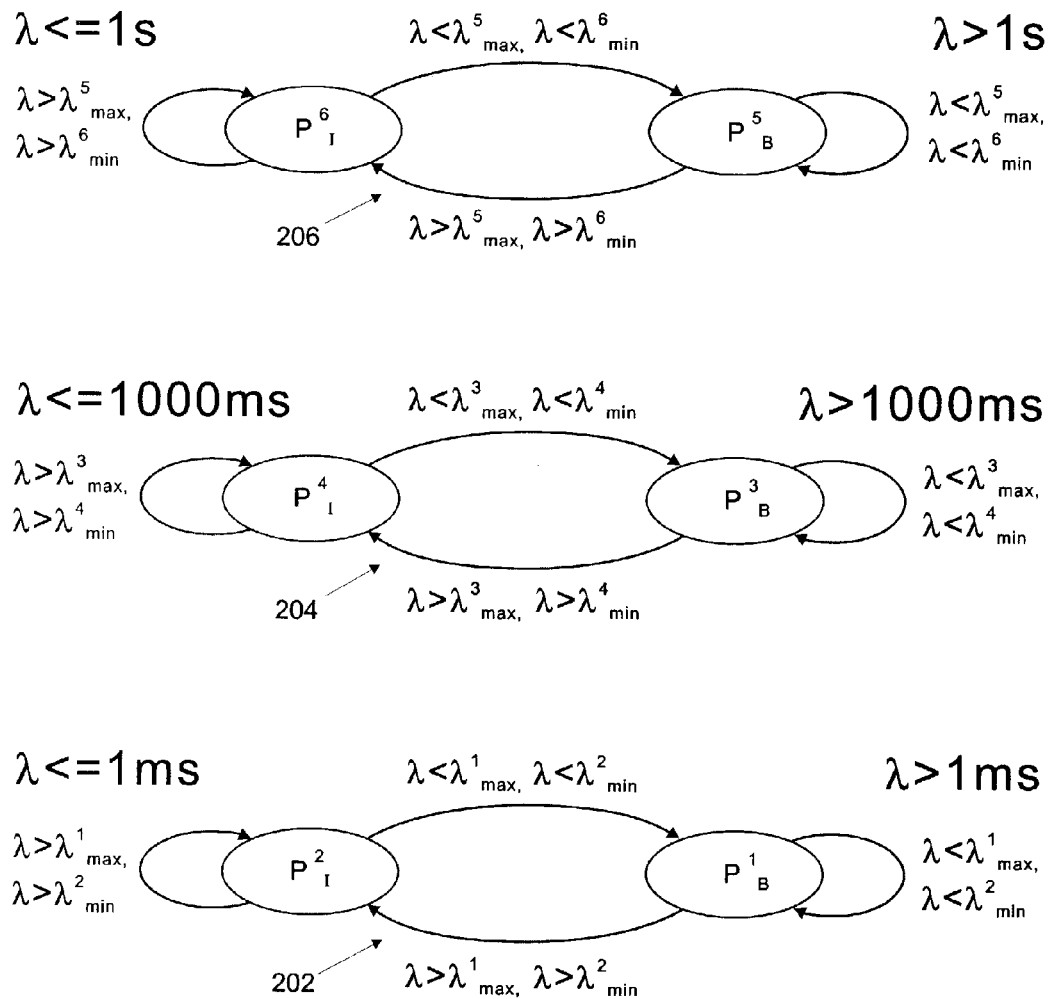
Fig: 2

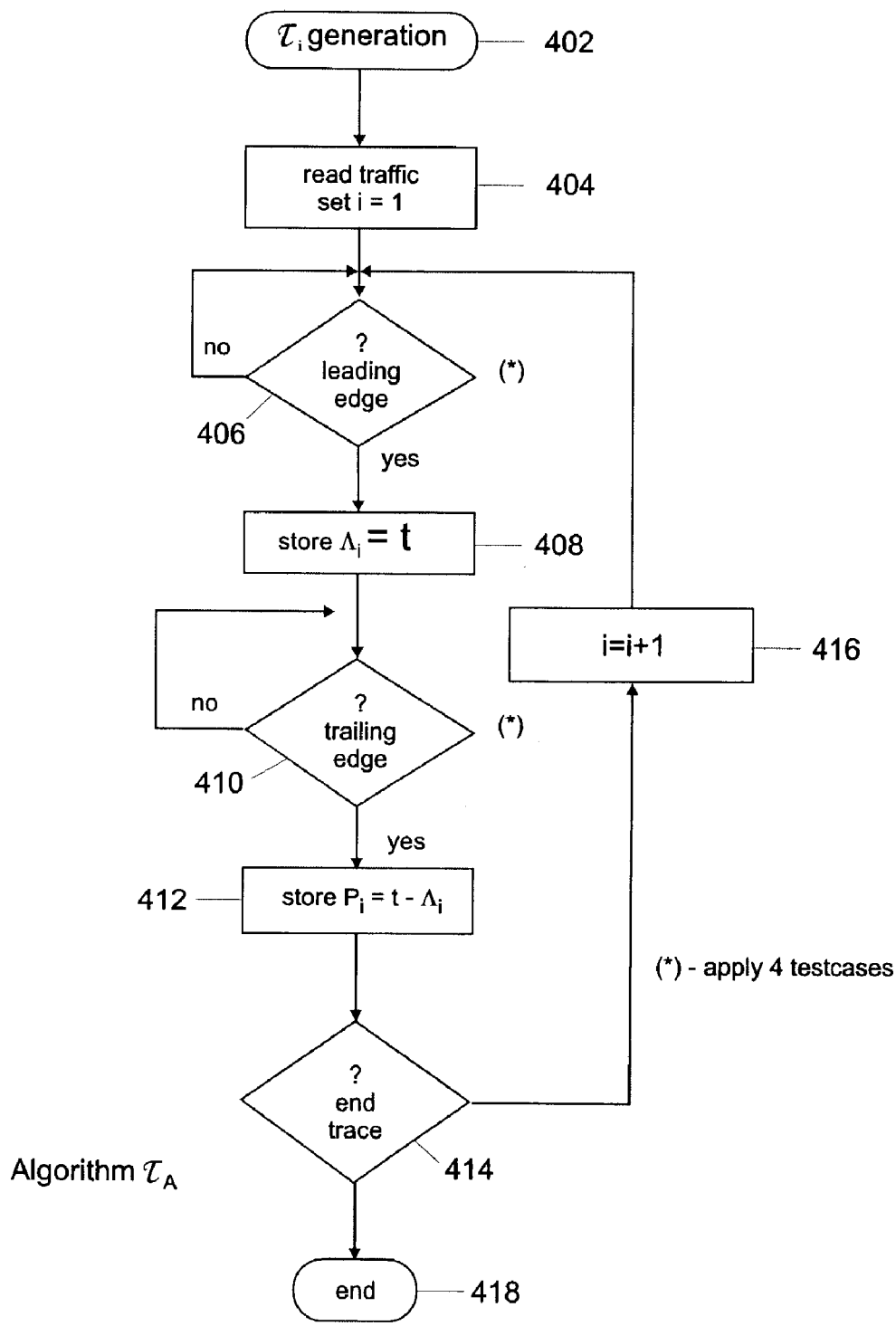
Fig: 4

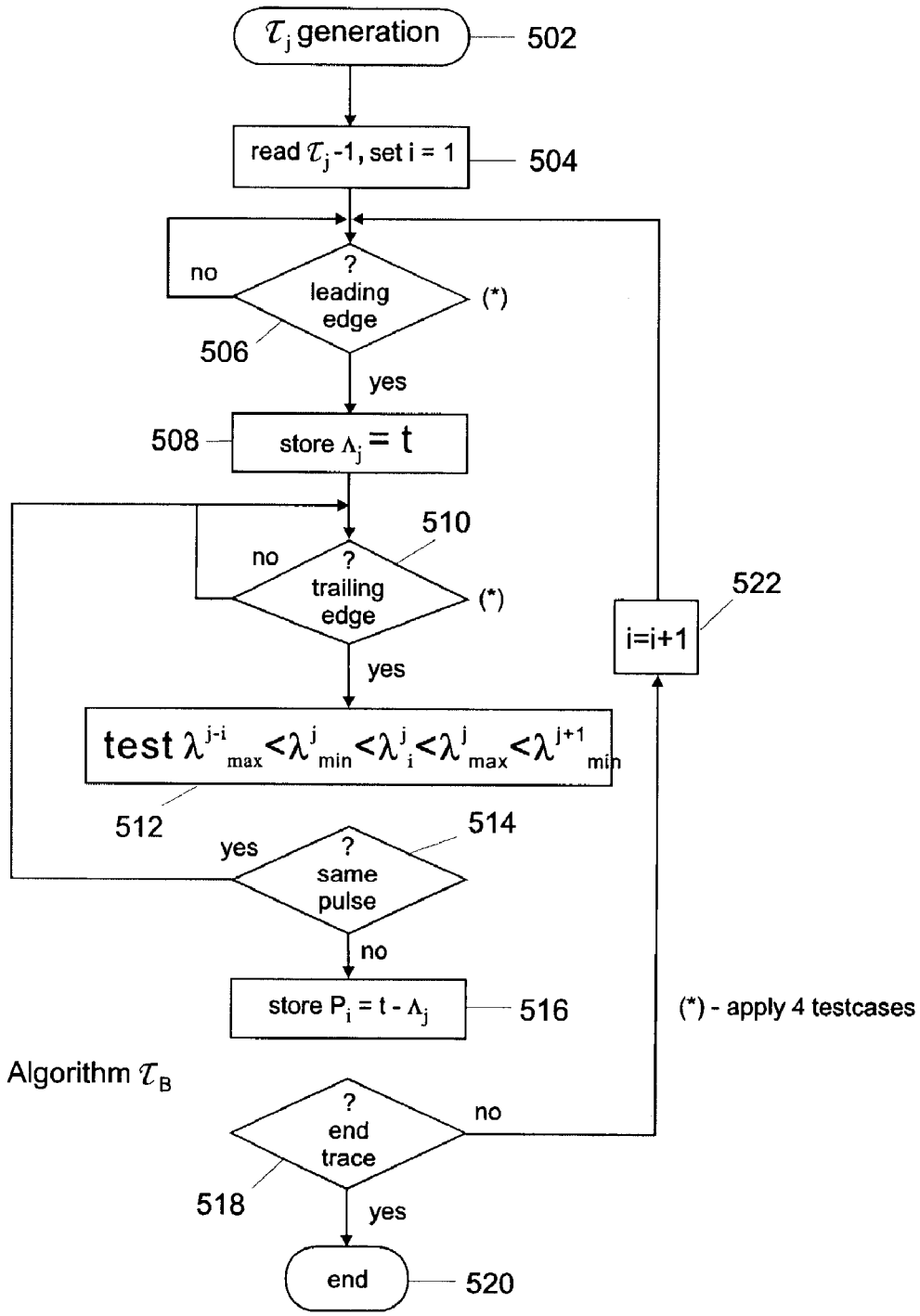
Fig: 5

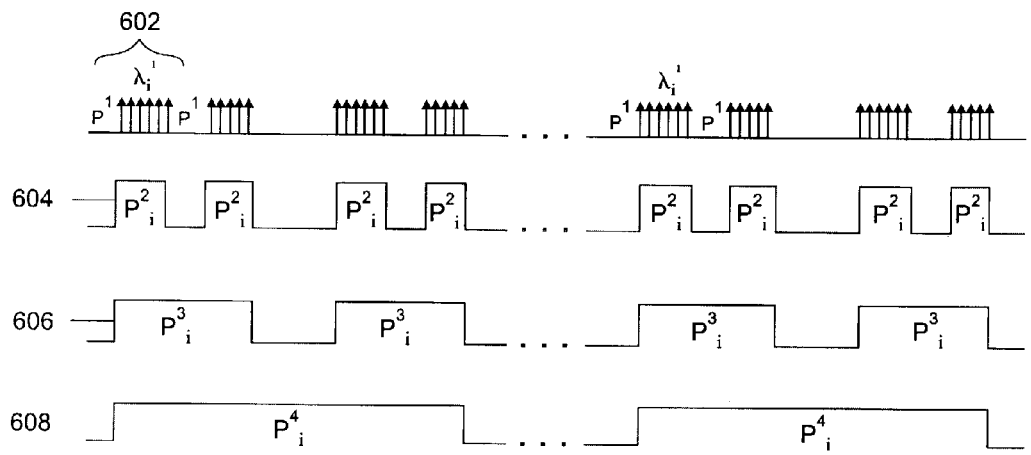
Fig: 6
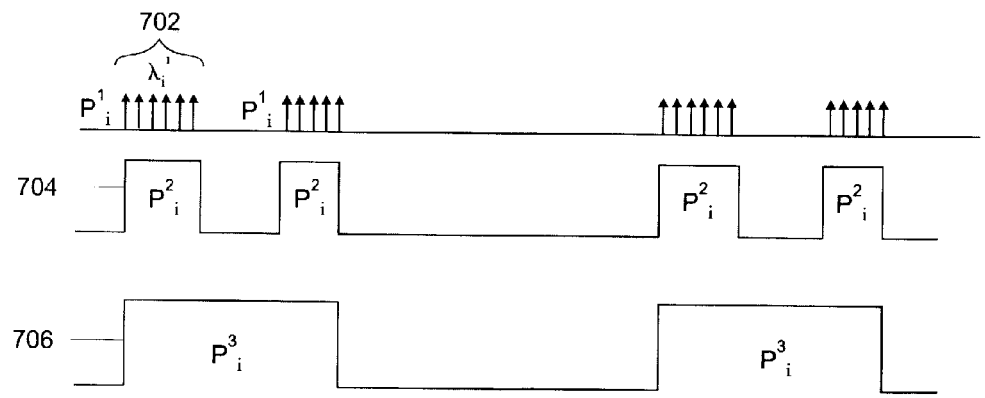
Fig: 7

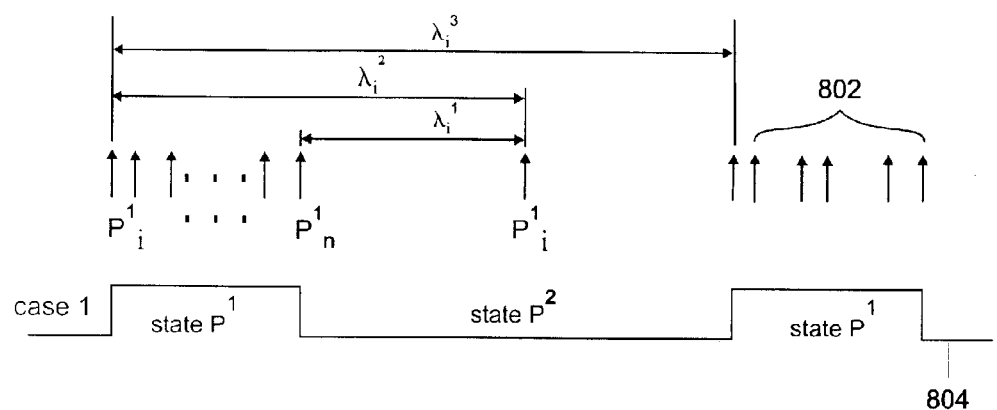
Fig: 8
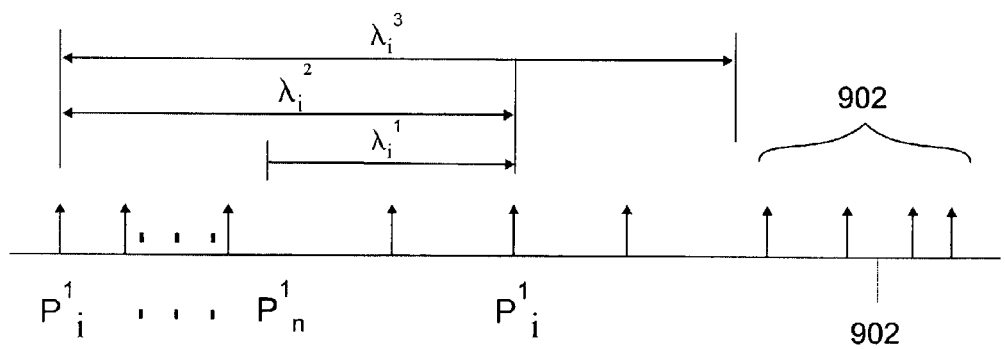
Fig: 9

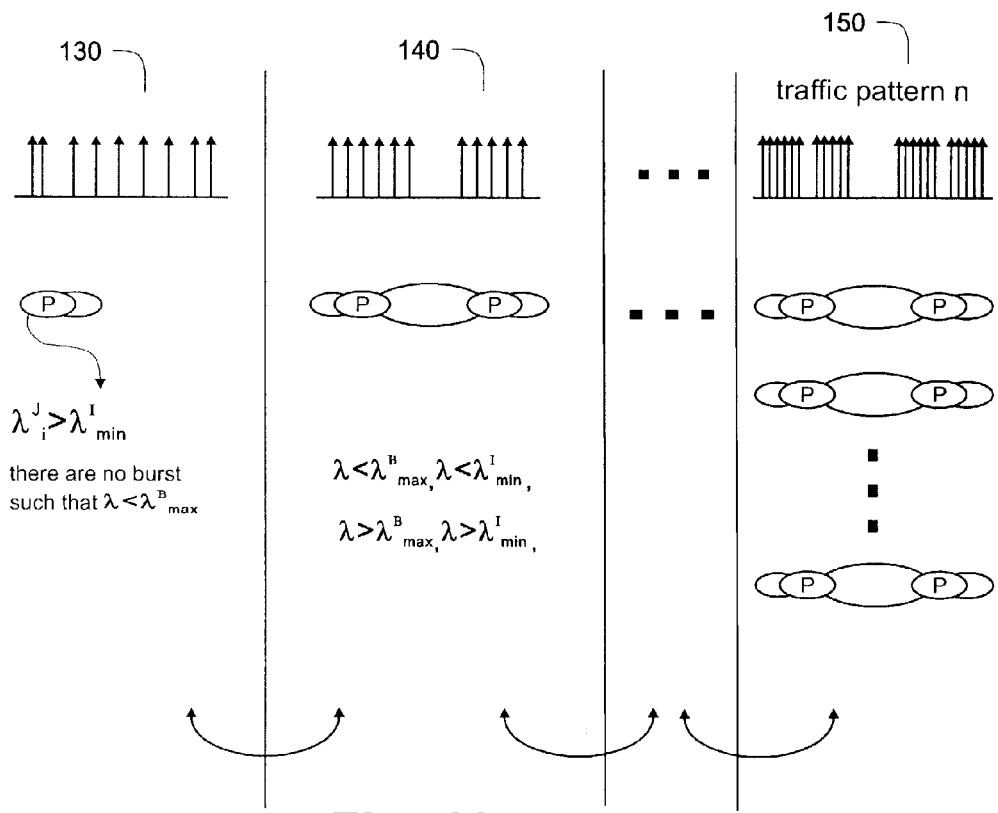
Fig: 10
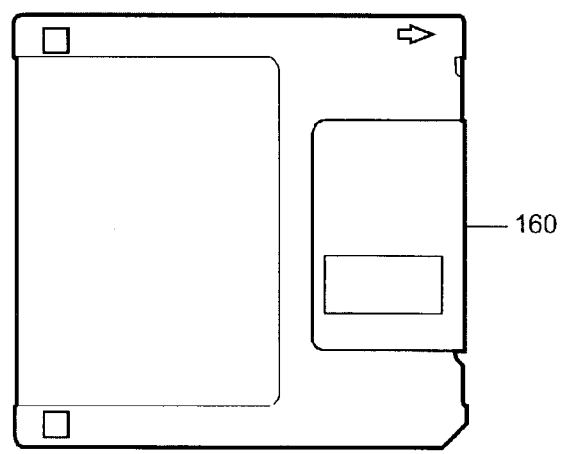
Fig: 11

MULTILEVEL ANALYSIS OF SELF-SIMILAR NETWORK TRAFFIC

CROSS REFERENCE TO RELATED APPLICATIONS

The present application is related to the following U.S. Pat. applications: U.S. Ser. No. 09/607,013, now U.S. Pat. No. 6,715,005; U.S. Ser. No. 09/607,133, now abandoned; and U.S. Ser. No. 10/417,467, filed Apr. 16, 2003, for "MMPP Analysis of Network Traffic Using a Transition Window". The content of these cross-referenced co-pending applications is hereby incorporated herein by reference.

FIELD OF THE INVENTION

This invention relates in general to the field of computer technology, and particularly to systems for the transfer of data. More specifically, the invention relates to the real-time modeling and analysis of data communication of self-similar network traffic at multiple levels.

BACKGROUND OF THE INVENTION

The flow of information in a network is often called 'traffic'. Units of information used in network communication are referred to as 'packet'. Packets generally arrive at a point in the network at random intervals resulting in 'bursts' of traffic resulting in congestion and 'idle' periods in which traffic is somewhat more sparse.

Systems that use a network to communicate messages can derive significant benefits from analysis that provides to the system a characterization of the network traffic. The Poisson Process is widely utilized to model aggregate traffic from voice sources. A Markov Modulated Poisson Process (MMPP) is often utilized to model aggregate traffic from data sources. Network traffic has been shown to be self-similar, therefore, a method used to analyze network traffic should be able to display behavior that is bursty and self-similar.

The present method uses a multilevel model that utilizes the model claimed and described in co-pending patent application Docket Number RPS920030018US1 filed concurrently herewith and entitled MMPP ANALYSIS OF NETWORK TRAFFIC USING A TRANSITION WINDOW as the base and replicating the model once for each time-scale displayed by the self-similar traffic. A single level, 2 state MMPP model is shown in FIG. 1.

SUMMARY OF THE INVENTION

The present method and system serve to model and analyze asynchronous network traffic that is bursty and self-similar using a Markov modulated Poisson process (MMPP) and self-similar traffic by making the MMPP model multilevel, where each level in the model represents a different time scale. By 'self-similar' is meant that the traffic displays the same characteristics of behavior (e.g. bursty or idle) at different time scales. This permits the same principles such as an MMPP model to be applied at each different scale. The model employs a transition window to determine the transition between states. This transition window is represented as $[\lambda^B_{max}, \lambda^I_{min}]$ wherein $\lambda^B_{max}$ is the upper boundary for heavy traffic arrival in the bursty state and $\lambda^I_{min}$ is the lower boundary for light traffic arrival in the idle state.

The complexity of the model grows as the number of levels in the model increases. This is not a problem because a model with something in the order of four levels has been deemed to be adequate. For example, others have confirmed that TCP traffic has been is described by at most four time scales. The present invention describes an example of a three-level model, although the model is general enough to represent any number of time scales. This model is an effective means to provide for network traffic analysis either in batch mode or in real time.

The invention relates to an article comprising a computer-readable medium which stores computer-executable instructions for processing traffic flow patterns associated with network data transmission. The instructions cause a machine to: a) receive traffic pattern data associated with the network transmission of data packets relating to the times of arrival of network data packets; b) apply an MMPP algorithm to the received pattern to define the traffic as being in the bursty state or the idle state; and c) repeat the steps a) and b) one or more additional times at different time-scale levels. The different time levels are based on a bottom-up analysis and rely on the generation of a trace of a traffic pattern for a given time scale and the analysis of the trace to generate a trace of the next scale pattern. The algorithm utilizes a transition window to determine the transition between states. This transition window is represented as $[\lambda^B_{max}, \lambda^I_{min}]$ wherein $\lambda^B_{max}$ is the upper boundary for heavy traffic arrival in the bursty state and $\lambda^I_{min}$ is the lower boundary for light traffic arrival in the idle state.

The system analyzes network traffic that is bursty and self similar. It employs an MMPP to model network traffic (in real time or in a batch model) at a first level representing a given time scale. It then repeats the process to model the network traffic at one or more additional levels representing time scales that differ from the time scale in the first step. Each level typically includes 2 states of network traffic behavior comprising a bursty state representing heavy traffic conditions and an idle state representing light traffic conditions. The system employs a transition window to determine the transition between states. This transition window is represented as $[\lambda^B_{max}, \lambda^I_{min}]$ wherein $\lambda^B_{max}$ is the upper boundary for heavy traffic arrival in the bursty state and $\lambda^I_{min}$ is the lower boundary for light traffic arrival in the idle state. However, when the inter-arrival times for the bursty state and the idle state become approximately equal, the system defaults to a single state model. The analysis comprises the generation of a trace of a traffic pattern for a given time scale. This generated trace is then used to generate a trace of the next time scale pattern.

BRIEF DESCRIPTION OF THE DRAWINGS

FIG. 1 depicts an MMPP for modeling burst network traffic;

FIG. 2 is an illustration of a 3 level MMPP model;

FIG. 3 is a diagram of bursty, self similar network traffic;

FIG. 4 is a flow chart showing the generation of algorithm $\tau_A$;

FIG. 5 is a flow chart showing the generation of algorithm $\tau_B$;

FIG. 6 is a diagram of a 3-level, 6-state heavy, bursty, self similar network traffic;

FIG. 7 is a diagram of a 2-level, 4 state MMPP model;

FIG. 8 is a diagram of 1 level, 2 state bursty, self similar network traffic;

FIG. 9 is a diagram of 1 level, 1 state bursty model with light traffic, not bursty;

FIG. 10 shows an MMPP model having K-levels, and N-states for handling variable traffic; and FIG. 11 represents one medium for the execution of the program.

DETAILED DESCRIPTION OF THE INVENTION

An MMPP model 110, also sometimes referred to as a bimodal sequencer, is shown in FIG. 1. The model serves to predict inter-message arrival delays. The bursty state 112 describes the network traffic behavior when a burst of packets 114 occurs during heavy traffic conditions. During these bursts, the inter-arrival time between packets is Poisson distributed having a mean value for the time of $\lambda^B_{mean}$. The idle state 118 describes the network traffic between bursts, when the traffic characteristic 120 is light traffic with a Poisson distribution having a mean value of $\lambda^I_{mean}$ for the inter-arrival time. For the 2-state MMPP model to be a valid representation of the network traffic, the characteristics of the traffic are such that the mean time intervals during heavy (bursty) traffic are substantially shorter than the corresponding time intervals during light (idle) traffic, i.e. $\lambda^B_{mean} << \lambda^I_{mean}$. In the model, the traffic inter-arrival times for the bursty and idle states are represented by the boundary values $\lambda^B_{max}$ and $\lambda^I_{min}$ respectively. For the special case where $\lambda^I_{mean}$ approximately equal to $\lambda^B_{mean}$, the model defaults to a single state model. These values are used as the transition criteria between states, as shown in FIG. 1 ($\lambda$ represents the inter-arrival time of the last packet received). When the inter-arrival time slows down so that $\lambda > \lambda^I_{min}$ and $\lambda > \lambda^B_{max}$, the model transitions at 116 from the bursty state to the idle state. Conversely, when the arrival time becomes faster and $\lambda < \lambda^I_{min}$ and $\lambda < \lambda^B_{max}$, the model returns along 122 to the bursty state.

Since the representation of the network traffic in a model is an approximation, the length of the burst during state $P^B$ is an approximation with burst edges that are defined somewhat arbitrarily. In practice, the burst length is defined to satisfy the requirements of the user process. As previously mentioned, these values are used as the transition criteria between states. These boundary values define a transition window [$\lambda^B_{max}, \lambda^I_{min}$] that has as the left side the parameter $\lambda^B_{max}$ and as the right hand side the parameter $\lambda^I_{min}$. The first parameter $\lambda^B_{max}$ determines an upper bound for the packet inter-arrival time for the bursty state and the parameter $\lambda^I_{min}$ determines a lower bound for the packet inter-arrival time for the idle state. For the bursty state, $\lambda^B_{max}$ defines the probability $\rho^B$ that a packet with inter-arrival time lower than $\lambda^B_{max}$ belongs to the bursty state. Similarly, for the idle state, $\lambda^I_{min}$ defines the probability $\rho^I$ that a packet with inter-arrival time higher than $\lambda^I_{min}$ belongs to the idle state. Based on these probabilities, a decision can be made for each arriving packet of the particular state transition induced by the arrival.

Algorithms are described that allow the model to track changes in the network traffic dynamically. As the network traffic characteristics change over time, the mean inter-arrival times for the bursty state ($\lambda^B_{mean}$) and for the idle state ($\lambda^I_{mean}$) also change over time. For the model to track these changes over time, the values $\lambda^B_{max}$ and $\lambda^I_{min}$ change in proportion to the changes in the traffic. The values $\lambda^B_{max}$ and $\lambda^I_{min}$ define the sides of a transition window of length $k = \lambda^I_{min} - \lambda^B_{max}$. The size of the transition window [$\lambda^B_{max}, \lambda^I_{min}$] can be changed dynamically to be used in adaptive algorithms that control the process transition between states. For implementation in an algorithm used in that fashion, the transition window [$\lambda^B_{max}, \lambda^I_{min}$] can grow larger and smaller by changing the value of $\lambda^I_{min}$ and $\lambda^B_{max}$ accordingly. The specific value of the parameters used depends on the specific application of the algorithm.

Referring now to FIG. 2, the model consists of multiple 2-state MMPP models, with each level specialized to a given scale of the self-similar network traffic. Each 2-state MMPP model shown in FIG. 2 consists of a "bursty" state $P^B$, and an "idle" state $P^I$. The multilevel model involves the analysis needed to determine three different time scales, it being understood that this number of levels is illustrative only. The present invention uses a constructive/bottom-up approach, commencing with the shortest intervals between packet arrivals, and moving progressively to the longest inter-arrival times. Each level of self-similarity is analyzed and a trace representation of traffic at each corresponding level is generated and analyzed. Starting with the low-level traffic pattern 202 where the inter-arrival times are, e.g. 1 ms or less, $\lambda$ is in the idle state if it is more than $\lambda^1_{max}$ and more than $\lambda^2_{min}$ and in the bursty state if less than $\lambda^1_{max}$ and $\lambda^2_{min}$. A trace of that traffic pattern is generated, stored and then analyzed to generate a trace of the next time scale pattern 204 having inter-arrival times are e.g., 1000 ms or less. That trace and the time scale parameters are analyzed and stored. If $\lambda$ is more than $\lambda^3_{max}$, it is in the bursty state and more than $\lambda^4_{min}$, it is in the idle state. Each trace is then analyzed in similar fashion until the highest level time scale 206 (inter-arrival times of, for instance, 1 second or less) is reached and $\lambda$ is compared with $\lambda^5_{max}$ and $\lambda^6$ min. The stored traces are used to maintain historical data for the analysis algorithms. These algorithms are described here.

The analysis generates a sequence of traces of the form $\tau^1 . \tau^2, \ldots, \tau^k$, where $\tau^k = \{(\Lambda^k_1, P^k_1), (\Lambda^k_2, P^k_2), \ldots, (\Lambda^k_i, P^k_i)\}$. Each trace $\tau^k$ represents a different characteristic scale of the self-similar network traffic at a different scale and where, $\Lambda^k_i$ = the time stamp of leading of the packet and $P^k_i$ = the packet/burst size.

Packet arrivals and inter-burst transitions are detected in the following manner. Assume that packet $P_{i-1}$ presently belongs to burst state $P^1$. Then, the task is to detect whether packet $P_i$ belongs still to burst state $P^1$ or to the idle state $P^2$. The detection logic compares the incoming packet inter-arrival time $\lambda_i$ with $\lambda^B_{max}$ and $\lambda^I_{min}$. Four cases are possible:

Case 1. $\lambda_i < \lambda^B_{max}$ and $\lambda_i < \lambda^I_{min}$: $P_i$ is detected to belong to burst state $P^B$.

Case 2. $\lambda_i > \lambda^B_{max}$ and $\lambda_i > \lambda^I_{min}$: $P_i$ is detected to belong to idle state $P^I$.

Case 3. $\lambda_i > \lambda^B_{max}$ and $\lambda_i < \lambda^I_{min}$: $P_i$ is detected to be inside of the transition window [$\lambda^B_{max}, \lambda^I_{min}$]

In case 3, the next state transition selected is dependent on the user process requirements. This method can be applied to improve the performance of the network attached devices as will be described hereinafter. In particular, the application of the transition window approach will be described for managing the synchronization process in low-latency, high-bandwidth networks.

Case 4. $\lambda_i < \lambda^B_{max}$ and $\lambda_i > \lambda^I_{min}$: This is not a valid combination because both events can not occur at the same time.

These four cases (304, 306, 308, and 310) are illustrated in FIG. 3. The transition window [$\lambda^B_{max}, \lambda^I_{min}$] is illustrated as a rectangle 312, the packet arrivals as vertical arrows 302, and the incoming packet $P_i$ 302 illustrated as an X.

The traffic analysis algorithm has to accomplish several things:

1. Analyze the traffic to determine the type of traffic at the time. Then it has to adjust the parameters of the model to the traffic parameters.

2. For bursty self-similar traffic, but for other traffic as well, the algorithm analyzes the traffic to determine the parameters for each different time scale. Then it adjusts the parameters of the model to the traffic parameters.

3. It detects the changes to the traffic from time to time, adjusting the model parameters as needed.

Of course, these are all different aspects of the same problem, that of having the capability to represent highly variable network traffic.

Although typically the network traffic can be characterized as being bursty and self-similar, as described by the multi-scale MMPP model described above, the conditions of the traffic are such that a high variability can be expected from one time period to the other (minute to minute, hour to hour, day to day, week to week, etc.). It is important for the model used by the methodology to be able to capture this variability in a dynamic way, real-time. The model of the invention assumes bursty self-similar traffic, but it adapts to changes in the traffic from very light traffic, when traffic is not bursty, to more heavy bursty traffic, on to very heavy peaks where the traffic acquires self-similar characteristics. The model assumes the structure of a 2-state multilevel model, or a simpler 2-state single-level model or a single-state model, depending on the traffic. Between the two extremes, there is a continuum of conditions that are represented by the model. The model restructures itself adaptively to the changing conditions of the network traffic. For example, under light traffic conditions, the network traffic can be characterized by a simple Poisson distribution. As traffic intensity goes down, the mean inter-arrival time $\lambda^B_{mean}$ approaches that of the idle state inter-arrival time $\lambda^I_{mean}$ to the point where the two are no longer distinguished by the model. When the characteristics of the traffic are such that $\lambda^I_{mean}$ approximately equals $\lambda^B_{mean}$, a single state in the MMPP model represents the network traffic.

For the purposes of the model, the following states are considered, along with the related parameters in FIGS. 6-9.

a) 3-level, 6-state MMPP model: heavy, bursty, self-similar traffic. (FIG. 6)

b) 2-level, 4-state MMPP model: bursty, self-similar traffic. (FIG. 7)

c) 1-level, 2-state MMPP model: bursty traffic. (FIG. 8)

d) 1-level, 1-state MMPP model: light traffic, not bursty. (FIG. 9)

The theoretical maximum number of levels in the model depends on the number of different time scales displayed by the network traffic. That number is believed to be in the range of four levels. In practice, the scale will also be determined by one of the following conditions:

1. The length of the trace is too short to capture the information at scales beyond some number of levels.

2. The higher the time scale, both the storage requirements needed to handle a longer trace and the required computational times will be higher. Because of the storage and computational requirements for each level, some practical limit needs to be defined to the system.

3. The number of levels is defined as a system parameter. The time scales will not reflect self-similar traffic beyond some specified value. Therefore, the value should be established experimentally by the designer. Once an upper limit has been established for the different time scales, the procedure will track changes to the workload automatically and will adjust to the instantaneous burstiness of the workload. The method must then track traffic changes from one end of the spectrum to the other (a to d above).

Other, more complicated modeling schemes are possible. However, this example represents an adequate implementation of the invention.

As previously noted, the traffic burst analysis and trace generation consists of the sequential generation of traces of the form $\tau^1, \tau^2, \ldots, \tau^k$, where $\tau^k = \{(\Lambda^k_1, P^k_1), (\Lambda^k_2, P^k_2), \ldots, (\Lambda^k_i, P^k_i)\}$. Each trace $\tau^k$ represents a different characteristic scale of the self-similar network traffic at a different scale where $\Lambda^k_i$=time stamp of leading of the packet and $P^k_i$=the packet/burst size. This process applies a constructive or bottom-up approach (vs. a deconstructive or analytical approach, which is top-down.)

The input stream of each packet (i) is analyzed as shown in FIG. 4 (algorithm $\tau_A$).

Burst inter-arrival time, $\lambda^1_i = \Lambda^1_i - \Lambda^1_{i-1}$, as follows:

$\lambda^1_i$=the inter-arrival time between packets $P^1_i$, $\lambda^2_i$=the inter-arrival time between bursts of packets $P^2_i$, $\lambda^3_i$=the inter-arrival time between clusters (a burst of bursts) $P^3_i$, $\lambda^j_i$=the inter-arrival time between bursts of clusters $P^j_i$ The trace $\tau^1$ is generated at 402 as follows. An incoming packet (i) is read at 404 and i is set to a value of 1. The leading edge of the packet i is detected at 406. If the leading edge is not found, a second attempt is made to detect it. If detected, the arrival time is stored at 408 as time stamp $t = \Lambda_i$. The arrival of the trailing edge of the packet is detected at 410 and the formula $P_i = t - \Lambda_i$ representing the time interval between the detection of the leading edge and the trailing edge and the time stamp is calculated and recorded. If the trailing edge is not detected the first time, the process is repeated until detected. The packet size is then stored at 412. This process is repeated for each packet until the end of the trace is reached at 414. If the end is not reached, then the process is repeated for the next packet, i=i+1. The end of the trace is signaled at 418.

The four test cases are as follows:

Case 1. $\lambda_i < \lambda^B_{max}$ and $\lambda_i < \lambda^I_{min}$: $P_i$ is detected to belong to burst state $P^B$.

Case 2. $\lambda_i > \lambda^B_{max}$ and $\lambda_i > \lambda^I_{min}$: $P_i$ is detected to belong to idle state $P^I$.

Case 3. $\lambda_i > \lambda^B_{max}$ and $\lambda_i < \lambda^I_{min}$: $P_i$ is detected to be inside of the transition window $[\lambda^B_{max}, \lambda^I_{min}]$. In this case, the next state transition selected is dependent on the user process requirements.

Case 4. $\lambda_i < \lambda^B_{max}$ and $\lambda_i > \lambda^I_{min}$: This is not a valid combination because both can not occur.

The following trace is recorded into an ordered set with sequential format. Assume the following:

$$\tau^1 = \{(\Lambda^1_1, P^1_1), (\Lambda^1_2, P^1_2), \ldots, (\Lambda^1_i, P^1_i)\},$$

Where, $\Lambda^1_i$=the time stamp of leading of the packet, $P^1_i$=the packet size in microseconds.

Next, trace $\tau_j$ can be analyzed as shown in FIG. 5 (algorithm $\tau_B$). The trace generation starts at 502 as follows. The previous algorithm $\tau_{j-1}$ is read at 504 and i is set to a value of 1. The leading edge of the packet j is determined at 506. If the leading edge is not found, a second attempt is made to detect it. If detected, the arrival time is stored at 508 as time stamp $t = \Lambda_j$. With the arrival time of the leading edge stored, the arrival of the trailing edge is detected at 510 and the formula $P_j = t - \Lambda_j$ representing the time interval between the detection of the leading edge and the trailing edge and the time stamp is recorded. The packet arrival is then tested $\lambda^{j-1}_{max} < \lambda^j_{min} < \lambda^j_i < \lambda^j_{max} < \lambda^{j-1}_{min}$ at 512. If the packet is determined to be the same pulse at 514, the packet is again sent to 510 to detect the trailing edge. If it is not the same pulse, the value $_{Pj}=t-\Lambda_j$ is stored at 516. This procedure is repeated for each packet until the end of the trace is reached at 518. If this does not represent the end of the trace, the process is repeated for the next packet j=j+1 at 522. The end of the trace is signaled at 518.

From the analysis, the following trace is derived:

$$\tau^2=\{(\Lambda^2{}_1,P^2{}_1),(\Lambda^2{}_2,P^2{}_2),\ldots,(\Lambda^2{}_i,P^2{}_i)\},$$

Each trace can thus be analyze to produce a higher level trace. In general, the following set of traces are derived:

$$\tau^1, \tau^2, \tau^3, \ldots, \tau^k,$$

where trace $\tau^k=\{(\Lambda^k{}_1,P^k{}_1), (\Lambda^k{}_2,P^k{}_2), \ldots, (\Lambda^k{}_i,P^k{}_i)\}$, represents a different characteristic scale of the self-similar network traffic at a different scale.

Since the scale for each consecutive level is approximated by an exponential distribution, the following ordering is established:

$$\lambda^{j-1}{}_{max}<\lambda^j{}_{min}<\lambda^j{}_i<\lambda^j{}_{max}<\lambda^{j+1}{}_{min}$$

EXAMPLE 1

This relates to a 3 level, 6 state MMPP model to simulate heavy traffic that is bursty and self-similar as shown in FIG. 6. The packet bursts are shown by the vertical arrow clusters 602, and the first time level is shown as 604, the second time level as 606, and the third time level as 608.

1. Use algorithm $\tau_A$ to analyze input stream and generate trace $\tau^1=\{(\Lambda^1{}_1, P^1{}_1), (\Lambda^1{}_2,P^1{}_2), \ldots,(\Lambda^1{}_i,P^1{}_i)\}$.

2. Analyze parameters $\Lambda^1{}_i$ (the time stamp of leading of the packet), and $P^1{}_i$ (the packet size) from trace $\tau^1$. From this the inter-arrival time $\lambda_i$ is computed. Thus, there are four possible cases:

Case 1. $\lambda_i<\lambda^B_{1\,max}$ and $\lambda_i<\lambda^I_{1\,min}$: $P_i$ is detected to belong to burst state $P^B$.

Case 2. $\lambda_i>\lambda^B_{1\,max}$ and $\lambda_i>\lambda^I_{1\,min}$: $P_i$ is detected to belong to idle state $P_I$.

Case 3. $\lambda_i>\lambda^B_{1\,max}$ and $\lambda_i<\lambda^I_{1\,min}$: $P_i$ is detected to be inside of the transition window $[\lambda^B_{1\,max}, \lambda^I_{1\,min}]$. In this case, the next state transition selected is dependent on the user process requirements.

Case 4. $\lambda_i<\lambda^B_{1\,max}$ and $\lambda_i>\lambda^I_{1\,1min}$: This is not a valid combination because both can not occur.

These four cases are used as the test criteria in algorithm $\tau_B$ to generate $\Lambda^2{}_i$ (the time stamp of leading of the burst), and $P^2{}_i$ (the burst size). This analysis of trace $\tau^1$ generates trace $\tau^2=\{(\Lambda^2{}_1, P^2{}_1), (\Lambda^2{}_2,P^2{}_2), \ldots, (\Lambda^2{}_i,P^2{}_i)\}$.

2. Analyze parameters $\Lambda^2{}_i$ (the time stamp of leading of the packet), and $P^2{}_i$ (the packet size) from trace $\tau^2$. From this the inter-arrival time $\lambda_i$ is computed.

Case 1. $\lambda_i<\lambda^B_{2\,max}$ and $\lambda_i<\lambda^I_{2\,min}$: $P_i$ is detected to belong to burst state $P^B$.

Case 2. $\lambda_i>\lambda^B_{2\,max}$ and $\lambda_i>\lambda^I_{2\,min}$: $P_i$ is detected to belong to idle state $P^I$.

Case 3. $\lambda_i>\lambda^B_{2\,max}$ and $\lambda_i<\lambda^I_{2\,min}$: $P_i$ is detected to be inside of the transition window $[\lambda^B_{max}, \lambda^I_{min}]$. In this case, the next state transition selected is dependent on the user process requirements.

Case 4. $\lambda_i<\lambda^B_{2\,max}$ and $\lambda_i>\lambda^I_{2\,min}$: This is not a valid combination because both can not occur.

These four cases are used as the test criteria in algorithm $\tau_B$ to generate $\Lambda^3{}_i$ (the time stamp of leading of the burst), and $P^3{}_i$ (the burst size). This analysis of trace $\tau^2$ generates trace $\tau^3=\{(\Lambda^3{}_1,P^3{}_1),(\Lambda^3{}_2,P^3{}_2), \ldots,(\Lambda^3{}_i,P^3{}_i)\}$, 3. Analyze parameters $\Lambda^3{}_i$ (the time stamp of leading of the packet), and $P^3{}_i$ (the packet size) from trace $\tau^3$. From this, inter-arrival time $\lambda_i$ is computed. As explained before, four cases are possible:

Case 1. $\lambda_i<\lambda^B_{3\,max}$ and $\lambda_i<\lambda^I_{3\,min}$: $P_i$ is detected to belong to burst state $P^B$.

Case 2. $\lambda_i>\lambda^B_{3\,max}$ and $\lambda_i>\lambda^I_{3\,min}$: $P_i$ is detected to belong to idle state $P^I$.

Case 3. $\lambda_i>\lambda^B_{3\,max}$ and $\lambda_i<\lambda^I_{3\,min}$: $P_i$ is detected to be inside of the transition window $[\lambda^B_{max}, \lambda^I_{min}]$. In this case, the next state transition selected is dependent on the user process requirements.

Case 4. $\lambda_i<\lambda^B_{3\,max}$ and $\lambda_i>\lambda^I_{3\,min}$: This is not a valid combination because both can not occur.

These four cases are used as the test criteria in algorithm $\tau_B$ to generate $\Lambda^4{}_i$ (the time stamp of leading of the burst), and $P^4{}_i$ (the burst size). This analysis of trace $\tau^3$ generates trace $\tau^4=\{(\Lambda^4{}_1,P^4{}_1), (\Lambda^4{}_2,P^4{}_2), \ldots, (\Lambda^4{}_i,P^4{}_i)\}$,

EXAMPLE 2

This relates to a 2-level, 4-state MMPP model to simulate heavy traffic that is bursty and self-similar, as shown in FIG. 7. The packet bursts are shown by the vertical arrow clusters 702. The first level is shown as 704 and the second level as 706.

Use algorithm $\tau_A$ to analyze input stream and generate trace $\tau^1=\{(\Lambda^1{}_1,P^1{}_1),(\Lambda^1{}_2,P^1{}_2), \ldots,(\Lambda^1{}_i,P^1{}_i)\}$.

Analyze parameters $\Lambda^1{}_i$ (the time stamp of leading of the packet), and $P^1{}_i$ (the packet size) from trace $\tau^1$. From this the inter-arrival time is $\lambda_i$ computed. As explained before, there are four cases are possible:

Case 1. $\lambda_i<\lambda^B_{1\,max}$ and $\lambda_i<\lambda^I_{1\,min}$: $P_i$ is detected to belong to burst state $P^B$.

Case 2. $\lambda_i>\lambda^B_{1\,max}$ and $\lambda_i>\lambda^I_{1\,min}$: $P_i$ is detected to belong to idle state $P^I$.

Case 3, 4: These cases are the same as for Example 1.

These four cases are used as the test criteria in algorithms to generate $\Lambda^2{}_i$ (the time stamp of leading of the burst), and $P^2{}_i$ (the burst size). This analysis of trace $\tau^1$ generates trace $\tau^2=\{(\Lambda^2{}_1,P^2{}_1), (\Lambda^2{}_2,P^2{}_2), \ldots,(\Lambda^2{}_i,P^2{}_i)\}$.

Analyze parameters $\Lambda^2{}_i$ (the time stamp of leading of the packet), and $P^2{}_i$ (the packet size) from trace $\tau^2$. From this the inter-arrival time is $\lambda_i$ computed. As explained before, four cases are possible:

Case 1. $\lambda_i<\lambda^B_{2\,max}$ and $\lambda_i<\lambda^I_{2\,min}$: $P_i$ is detected to belong to burst state $P^B$.

Case 2. $\lambda_i>\lambda^B_{2\,max}$ and $\lambda_i>\lambda^I_{2\,min}$: $P_i$ detected to belong to idle state $P^I$.

Case 3, 4: These cases are the same as for Example 1.

These four cases are used as the test criteria in algorithm $\tau_B$ to generate $\Lambda^3{}_i$ (the time stamp of leading of the burst), and $P^3{}_i$ (the burst size). This analysis of trace $\tau^2$ generates trace $\tau^3=\{(\Lambda^3{}_1,P^3{}_1),(\Lambda^3{}_2,P^3{}_2), \ldots,(\Lambda^3{}_i,P^3{}_i)\}$.

EXAMPLE 3

This is directed to a 1-level, 2-state MMPP model to simulate heavy traffic that is bursty and self-similar, and is shown in FIG. 8. The packet bursts are shown by the vertical arrow clusters 802, and the only time level is shown as 804.

First, use algorithm $\tau_A$ to analyze input stream and generate trace $\tau^1=\{(\Lambda^1{}_1,P^1{}_1), (\Lambda^1{}_2,P^1{}_2), \ldots,(\Lambda^1{}_i,P^1{}_i)\}$.

Then, analyze parameters $\Lambda^1{}_i$ (the time stamp of leading of the packet), and $P^1{}_i$ (the packet size) from trace $\tau^1$. From this the inter-arrival time is $\lambda_i$ computed. As explained before, there are four cases are possible:

Case 1. $\lambda_i<\lambda_1^B{}_{max}$ and $\lambda_i<\lambda_1^I{}_{min}$: $P_i$ is detected to belong to burst state $P^B$.

Case 2. $\lambda_i>\lambda_1^B{}_{max}$ and $\lambda_i>\lambda_1^I{}_{min}$: $P_i$ is detected to belong to idle state $P^I$.

Case 3, 4: These cases are the same as for Example 1.

These four cases are used as the test criteria in algorithm $\tau_B$ to generate $\Lambda^2_i$ (the time stamp of leading of the burst), and $P^2_i$ (the burst size). This analysis of trace $\tau^1$ generates trace $\tau^2=\{(\Lambda^2_1,P^2_1),(\Lambda^2_2,P^2_2),\ldots,(\Lambda^2_i,P^2_i)\}$.

EXAMPLE 4

FIG. 9 shows a 1-level, 1-state MMPP model to simulate light traffic that is not bursty, with the packet arrivals shown as 902, and the time line as 904. It involves the following steps:

1. Use algorithm $\tau_A$ to analyze input stream and generate trace $\tau^1=\{(\Lambda^1_1,P^1_1),(\Lambda^1_2,P^1_2),\ldots,(\Lambda^1_i,P^1_i)\}$.

2. Analyze parameters $\Lambda^1_i$ (the time stamp of leading of the packet), and $P^1_i$ (the packet size) from trace $\tau^1$.

3. From this the inter-arrival time is $\lambda_i$ computed. As explained before, there are four possible cases:

Case 1. $\lambda_i<\lambda_1^B{}_{max}$ and $\lambda_i<\lambda_1^I{}_{min}$: There are no packets detected that belong to burst state $P^B$.

Case 2. $\lambda_i>\lambda_1^B{}_{max}$ and $\lambda_i>\lambda_1^I{}_{min}$ and: All packet inter-arrivals are detected as belonging to idle state $P^I$.

Case 3, 4: These cases are the same as for Example 1.

These four cases are used as the test criteria in algorithm $\tau_B$ to generate $\Lambda^2_1$ (the time stamp of leading of the burst), and $P^2_i$ (the burst size). Since there are no bursts in this traffic, trace $\tau^2$ does not exist.

EXAMPLE 5

A K-level, N-state MMPP model to simulate variable traffic is shown in FIG. 10. The packet bursts are shown by the vertical arrows 160. Traffic pattern 1 (130) is not bursty and shows a low density of arrows 170. Traffic pattern 2 (140) shows 2 states of bursty and idle traffic represented by arrows 170; and traffic pattern n (150) represents bursts of bursts shown by multiple clusters of arrows 180.

The conditions of the traffic are such that a high variability can be expected from one time period to the other (minute to minute, hour to hour, day to day, week to week, etc.). It is important for the model used by the methodology to be able to capture this variability in a dynamic way, real-time. The model of the invention assumes bursty self-similar traffic, but it adapts to changes in the traffic from very light traffic (pattern 1) when traffic is not bursty, to more heavy bursty traffic (pattern 2), on to very heavy peaks (pattern 3) where the traffic acquires self-similar characteristics. The model assumes the structure of a 2-state multilevel model, or a simpler 2-state single-level model or a single-state model, depending on the traffic. Between the two extremes, there is a continuum of conditions that are represented by the model. The model restructures itself adaptively to the changing conditions of the network traffic.

FIG. 11 shows a computer-readable medium in the form of a floppy disc 160 for containing the software implementation of the program to carry out the various steps of modeling the network traffic according to the present invention. Other machine readable storage mediums are fixed hard drives, optical discs, magnetic tapes, semiconductor memories such as read-only memories (ROMs), programmable (PROMs), etc. The article containing this computer readable code is utilized by executing the code directly from the storage device, or by copying the code from one storage device to another storage device, or by transmitting the code on a network for remote execution.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

What is claimed is:

1. In a computer-implemented system comprising a multilevel model for tracking dynamic changes in asynchronous data transfer that is bursty and self similar, said model comprising
    (a) a Markov modulated Poisson process (MMPP) algorithm to analyze network traffic at a first level representing a given time scale;
    (b) replication means for using the MMPP algorithm to analyze the network traffic on at least one level representing a time scale that differs from the time scale on the first level, and
    (c) a transition window for determining the transition from one time scale to another.

2. The system according to claim 1 wherein the multilevel model consists of two states of network traffic behavior comprising a bursty state representing heavy traffic conditions and an idle state representing light traffic conditions.

3. The system according to claim 2 wherein the transition window is represented as $[\lambda^B{}_{max}, \lambda^I{}_{min}]$ and wherein $\lambda^B{}_{max}$ is the upper boundary for heavy traffic arrival in the bursty state and $\lambda^I{}_{min}$ is the lower boundary for light traffic arrival in the idle state.

4. The system according to claim 1 wherein the model includes a default to a single state model as the mean inter-arrival times of packets in the bursty state and in the idle state become approximately equal.

5. The system according to claim 1 further including the capability of using a bottom-up analysis of traffic at each level to determine the traffic pattern at the next time scale.

6. The system according to claim 5 wherein the analysis comprises the ability to generate a trace of the traffic pattern for a given time scale.

7. The system according to claim 6 wherein the analysis of the generated trace at the given time scale can generate a trace of the next higher time scale pattern.

8. The system according to claim 1 wherein the model has the capability of adapting to changes in traffic patterns within a given time scale.

9. The system according to claim 3 wherein the model has the further ability to dynamically adjust the parameters of the transition window in response to an incoming traffic load.

10. The system according to claim 9 wherein the transition window is useful for managing the process of synchronization of low-latency, high-bandwidth networks.

11. A computer implemented method for a multi-level tracking of dynamic changes in asynchronous network traffic in a computer network, the method comprising the steps of:
    a) generating a trace of a low-level traffic pattern;
    b) analyzing the low-level pattern to generate a trace representing an approximation of the next time scale pattern;
    c) repeating the trace generation and analysis for each successive higher level traffic pattern; and
    d) using a Markov modulated Poisson process (MMPP) algorithm to generate each model, wherein each model consists of two states of network traffic behavior, wherein the two states of network traffic behavior comprise a bursty state representing the inter-arrival time of data packet during heavy traffic conditions and an idle state representing the inter-arrival time of data packet during light traffic conditions.

12. The method according to claim 11 wherein if the inter-rival times for the bursty state and the idle state become approximately equal, the model defaults to a single state model.

13. The method according to claim 11 further including a bottom-up analysis step to determine the different time scales.

14. The method according to claim 13 wherein the analysis step comprises generating a trace of a traffic pattern for a given time scale.

15. The method according to claim 11 including adapting to changes in traffic pattern within a given time scale.

16. The method according to claim 11 wherein the transition window is represented as $[\lambda^B_{max}, \lambda^I_{min}]$ and wherein $\lambda^B_{max}$ is the upper boundary for heavy traffic arrival in the bursty state and $\lambda^I_{min}$ is the lower boundary for light traffic arrival in the idle state.

17. The method according to claim 16 including the step of dynamically adjusting the parameters of the transition window in response to the incoming traffic load.

18. The method according to claim 17 including the use of the transition window for managing the process of synchronization of low-latency, high-bandwidth networks.

19. An article comprising a computer-readable medium which stores computer-executable instructions for processing traffic flow patterns associated with network data transmission, when executed by a computer, the instructions causing the computer to:

(a) receive traffic pattern data associated with the network transmission of data packets relating to the inter-arrival time of the data packets during a time level when the traffic is self-similar;

(b) apply a Markov modulated Poisson process (MMPP) algorithm to the received pattern; and (c) repeat the steps (a) and (b) one or more additional times at different time levels.

20. The article according to claim 19 wherein the instructions cause a trace to be generated at the first time level to represent the traffic at that level, and to be analyzed to generate the trace of the pattern at the next time level.

21. The article according to claim 20 wherein the instructions utilize a transition window to predict traffic flow as being bursty or as idle.

22. The article according to claim 21 wherein the transition window is represented as $[\lambda^B_{max}, \lambda^I_{min}]$ and wherein $\lambda^B_{max}$ is the upper boundary for heavy traffic arrival in the bursty state and $\lambda^I_{min}$ is the lower boundary for light traffic arrival in the idle state.

* * * * *